United States Patent
McNeely

(10) Patent No.: US 9,200,726 B2
(45) Date of Patent: Dec. 1, 2015

(54) VIBRATION DAMPING DEVICE

(71) Applicant: Michael McNeely, Stafford, TX (US)

(72) Inventor: Michael McNeely, Stafford, TX (US)

(73) Assignee: Pentair Flow Services AG, Schaffhausen (CH)

(*) Notice: Subject to any disclaimer, the term of this patent is extended or adjusted under 35 U.S.C. 154(b) by 0 days.

(21) Appl. No.: 14/198,345

(22) Filed: Mar. 5, 2014

(65) Prior Publication Data
US 2014/0251462 A1   Sep. 11, 2014

Related U.S. Application Data

(60) Provisional application No. 61/773,458, filed on Mar. 6, 2013.

(51) Int. Cl.
| | |
|---|---|
| *F16K 29/00* | (2006.01) |
| *F16K 47/04* | (2006.01) |
| *F16K 1/12* | (2006.01) |
| *F16K 47/00* | (2006.01) |

(52) U.S. Cl.
CPC .............. *F16K 47/04* (2013.01); *F16K 1/126* (2013.01); *F16K 47/00* (2013.01); *Y10T 137/7793* (2015.04); *Y10T 137/7904* (2015.04)

(58) Field of Classification Search
CPC ....... F16K 1/126; F16K 47/00; F16K 47/045; F16K 47/04; Y10T 137/7793; Y10T 137/7904
USPC ............. 137/331, 514–514.7; 251/48, 56, 58, 251/296
See application file for complete search history.

(56) References Cited

U.S. PATENT DOCUMENTS

| | | | | |
|---|---|---|---|---|
| 2,609,803 A | * | 9/1952 | Doughty | 123/90.28 |
| 2,609,804 A | * | 9/1952 | Doughty | 123/90.28 |
| 4,061,115 A | * | 12/1977 | Predhome, Jr. | 123/90.16 |
| 4,241,814 A | | 12/1980 | Masclet | |
| 4,316,480 A | * | 2/1982 | Kah, Jr. | 137/119.03 |
| 4,424,773 A | * | 1/1984 | Wendel et al. | 123/90.29 |
| 4,460,009 A | * | 7/1984 | Nanci et al. | 137/243.6 |
| 4,531,542 A | * | 7/1985 | Looney | 137/514.7 |
| 4,720,087 A | | 1/1988 | Duclos et al. | |
| 4,749,070 A | | 6/1988 | Moser et al. | |

(Continued)

FOREIGN PATENT DOCUMENTS

| | | |
|---|---|---|
| EP | 2187084 A1 | 5/2010 |
| WO | 2009004765 A2 | 1/2009 |
| WO | 2009100205 A1 | 8/2009 |

OTHER PUBLICATIONS

PCT Patent Application No. PCT/US14/021316, filed Mar. 6, 2014.

*Primary Examiner* — Jessica Cahill
(74) *Attorney, Agent, or Firm* — Quarles & Brady LLP

(57) ABSTRACT

Embodiments of the invention provide a vibration damping system including a fixed element, a moveable element arranged to move linearly along an axis relative to the fixed element in response to a non-mechanical force, and an inerter element coupling the moveable element to the fixed element, and configured to convert the linear motion of the moveable element into rotational motion about the axis. The vibration damping system may be applied to many types of valves. In some embodiments, the vibration damping system may be applied to pressure relief valves. In some embodiments, the moveable element rotates to provide inertial damping. In other embodiments, the inerter element rotates to provide inertial damping.

7 Claims, 17 Drawing Sheets

(56) References Cited

U.S. PATENT DOCUMENTS

| | | |
|---|---|---|
| 6,352,143 B1 | 3/2002 | Niaura et al. |
| 6,516,765 B1 * | 2/2003 | Becker, Jr. ............ 123/90.28 |
| 7,316,303 B2 | 1/2008 | Smith |
| 8,261,893 B2 | 9/2012 | Becker et al. |
| 8,387,762 B2 | 3/2013 | Kondo et al. |
| 8,490,761 B2 | 7/2013 | Kondo |
| 8,607,942 B2 | 12/2013 | Becker et al. |
| 8,641,052 B2 | 2/2014 | Kondo et al. |
| 8,701,845 B2 | 4/2014 | Kondo |
| 2004/0231934 A1 * | 11/2004 | Heo ............ 188/284 |
| 2009/0139225 A1 | 6/2009 | Wang et al. |
| 2013/0032442 A1 | 2/2013 | Tuluie |
| 2013/0037362 A1 | 2/2013 | Gartner et al. |
| 2013/0319807 A1 | 12/2013 | Gartner |
| 2014/0102839 A1 | 4/2014 | Becker et al. |

\* cited by examiner

VIBRATION DAMPING DEVICE

RELATED APPLICATIONS

This application claims the benefit of U.S. Provisional Patent Application No. 61/773,458 filed on Mar. 6, 2013, the entire disclosure of which is hereby incorporated herein by reference.

BACKGROUND

The invention relates generally to devices for controlling linear vibration by converting linear motion to rotary motion. In more particular embodiments, the invention relates to devices for controlling vibrations in valves (e.g., pressure relief valves).

BRIEF SUMMARY OF THE INVENTION

In one aspect, the invention provides a vibration damping system that includes a fixed element, a moveable element arranged to move linearly along an axis relative to the fixed element in response to a non-mechanical force, and an inerter element coupling the moveable element to the fixed element, and configured to convert the linear motion of the moveable element into rotational motion about the axis.

In some embodiments, the moveable element is slidably received in the fixed element, or the movable element slides relative to the fixed element in response to a predetermined pressure, or the moveable element is moveable between a first position and a second position and the vibration damping system further includes a biasing element biasing the moveable element toward the first position, or the inerter element defines a cam profile, or the inerter element causes the moveable element to rotate as the moveable member moves linearly, or the inerter element rotates in response to linear movement of the moveable element, or the inerter element defines a slot with a helical cam profile and the moveable element includes a projection received in the slot such that linear movement of the moveable element is converted to rotational motion along the cam profile and wherein moveable element is inhibited from rotating and the cam profile causes the inerter element to rotate about the axis.

In another aspect, the invention provides a vibration damping system that includes a fixed element defining a cam profile, and a floating element coupled to the fixed element and movable relative to the fixed element between a first position and a second position. The cam profile converts linear motion of the floating element into rotational movement of the floating element to provide inertial damping.

In some embodiments, the floating element is movable in response to a non-mechanical force, or the floating element moves linearly along an axis between the first position and the second position, and rotates about the axis in response to linear motion, or the cam profile is helical, or the mass of the floating element and the rotational motion provide an inertial damping effect.

In another aspect, the invention provides a vibration damping system that includes a fixed element, a floating element coupled to the fixed element for linear motion along an axis and constrained such that rotation of the floating element is inhibited, and an inerter element coupled to the fixed element for rotary movement about the axis and constrained such that the inerter element does not move linearly relative to the floating element. The inerter element rotates in response to linear movement of the floating element to convert linear energy to rotary energy.

In some embodiments, the fixed element defines a constraining slot and the floating element includes a constraining pin received in the constraining slot, the interaction of the constraining pin and the constraining slot inhibiting rotation of the floating element relative to the fixed element, or the inerter element defines a cam profile and the floating element engages the cam profile such that linear movement of the floating element forces the inerter element to rotate along the cam profile, or the cam profile is helical, or the mass of the inerter element and the rotational motion thereof provide an inertial damping effect or In some embodiments, the floating element is moveable in response to a non-mechanical force.

In another aspect, the invention provides a valve that includes a housing defining an inlet, an outlet, and a valve seat between the inlet and the outlet, a valve member arranged at least partially within the housing and movable between an open position where flow is provided from the inlet through the valve seat to the outlet, and a closed position where flow is inhibited through the valve seat, and an inerter element arranged to convert linear motion of the valve member into rotary movement, thereby damping the valve.

In some embodiments, the valve further includes a biasing element that biases the valve member toward the closed position, or the valve member moves linearly between the open position and the closed position, the linear motion of the valve member converted by the inerter element into rotary movement of the valve member, the mass and rotational movement of the valve member providing inertial damping, or the inerter element is fixed to the housing, or the valve member moves linearly between the open position and the closed position, or the inerter element rotates in response to the linear movement of the valve member, the mass and rotational movement of the inerter element providing inertial damping, or the valve member is coupled to the housing such that rotary movement of the valve member is inhibited, or the inerter element defines a cam profile, the valve member engaging the cam profile, or the cam profile is helical, or the valve member is biased toward the open position by a pressure, or the valve member actuates in response to a non-mechanical force.

In another aspect, the invention provides a valve that includes a housing defining an inlet, an outlet, and a valve seat between the inlet and the outlet, a valve member arranged at least partially within the housing and movable between an open position where flow is provided from the inlet through the valve seat to the outlet, and a closed position where flow is inhibited through the valve seat, the valve member coupled to the housing for linear and rotary movement relative to the housing about an axis, and an inerter element substantially fixed to the housing and defining a cam profile, a portion of the valve member engaging the cam profile such that in response to a non-mechanical force the valve member moves between the open position and the closed position and linear motion of the valve member is converted to rotary motion of the valve member, thereby damping the valve.

In some embodiments, the cam profile is helical, or the valve member includes a pin that engages the cam profile, or the valve member is biased toward the closed position, or the valve member is coupled to the inerter element such that the inerter element supports the valve member for linear motion along the axis and rotation about the axis.

In another aspect, the invention provides a valve that includes a housing defining an inlet, an outlet, and a valve seat between the inlet and the outlet, a valve member arranged at least partially within the housing and movable between an open position where flow is provided from the inlet through the valve seat to the outlet, and a closed position where flow is inhibited through the valve seat, the valve member coupled to the housing for linear movement relative to the housing along an axis and constrained such that the valve member does not rotate about the axis, and an inerter element coupled to the valve member and defining a cam profile, the inerter element arranged to rotate along the cam profile relative to the valve member about the axis in response to linear movement of the valve member.

In some embodiments, the cam profile is helical, or the valve member includes a pin that engages the cam profile, or the valve member is biased toward the closed position, or the valve member supports the inerter element for rotation about the axis.

In another aspect, the invention provides a pressure relief valve that includes a housing defining an inlet, an outlet, and a valve seat between the inlet and the outlet, a bonnet coupled to the housing and including a controller, an inerter system coupled between the housing and the bonnet and including an inerter hub fixed to the housing to inhibit substantial rotation and linear movement, the inerter hub defining a cam profile, and a valve member received by the inerter hub and moveable between an open position where flow is provided from the inlet through the valve seat to the outlet, and a closed position where flow is inhibited through the valve seat, a portion of the valve member engaging the cam profile. The controller biases the valve member toward the closed position. The valve member moves toward the open position when a predetermined pressure is achieved within the inlet, and linear movement of the valve member between the open position and the closed position causes rotation of the valve member along the cam profile to provide inertial damping.

In some embodiments, the cam profile is a slot formed in the inerter hub, and the valve member includes a pin that engages the slot, or the cam profile is helical, or the valve member moves linearly and rotates about an axis, or the controller is an adjustable spring, or the valve member includes a disk holder arranged to receive a disk for sealing against the valve seat, and a central shaft that is received by the inerter hub, the central shaft extending through the inerter hub, or the valve member is coupled to the inerter hub by a bearing element.

In another aspect, the invention provides a pressure relief valve that includes a housing defining an inlet, an outlet, and a valve seat between the inlet and the outlet, a bonnet coupled to the housing and including a controller, an inerter system coupled between the housing and the bonnet and including an inerter hub fixed to the housing to inhibit substantial rotation and linear movement of the inerter hub relative to the housing, a valve member received by the inerter hub and moveable between an open position where flow is provided from the inlet through the valve seat to the outlet, and a closed position where flow is inhibited through the valve seat, the valve member arranged to move linearly relative to the inerter hub and constrained such that rotation of the valve member is inhibited, and a flywheel defining a cam profile and arranged to rotate relative to the valve member. The controller biases the valve member toward the closed position. The valve member moves toward the open position when a predetermined pressure is achieved within the inlet, and linear movement of the valve member between the open position and the closed position causes rotation of the flywheel along the cam profile to provide inertial damping.

In some embodiments, the pressure relief valve also includes a bellows arranged to inhibit fluid communication between the housing and the bonnet, or linear movement of the flywheel is inhibited, or the cam profile is helical, or the valve member includes a pin that engages the cam profile, or valve member includes a constraining pin and the inerter hub defines a constraining slot, the constraining pin engaging the constraining slot to inhibit rotation of the valve member.

In another aspect, the invention provides a pressure relief valve that includes a housing defining an inlet, an outlet, and a valve seat between the inlet and the outlet, a bonnet coupled to the housing and including a controller, an inerter system is coupled between the housing and the bonnet and includes an inerter hub coupled to the housing such that rotation and linear movement of the inerter hub is inhibited, a cam element coupled to the inerter hub and defining a cam profile, a valve member received by the inerter hub and moveable between an open position where flow is provided from the inlet through the valve seat to the outlet, and a closed position where flow is inhibited through the valve seat, and a cam follower coupled between the cam element and the valve member and movable with the valve member. The controller biases the valve member toward the closed position. The valve member moves toward the open position when a predetermined pressure is achieved within the inlet, and linear movement of the valve member between the open position and the closed position causes rotation of the valve member and the cam follower along the cam profile to provide inertial damping.

In some embodiments, the pressure relief valve also includes a jerk absorber arranged between the inciter hub and the cam element, or the cam follower includes a pin that engages the cam profile and guides the movement of the valve member along the cam profile, or the valve member is arranged for linear movement and rotation about an axis, and the pin is positioned off-center with respect to the axis, or the cam follower element is fixed to the valve member to inhibit substantial rotation and linear movement with respect to the valve member, or the cam element is threaded into the inciter hub, or the cam profile is helical.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION OF THE INVENTION

Figure 1:
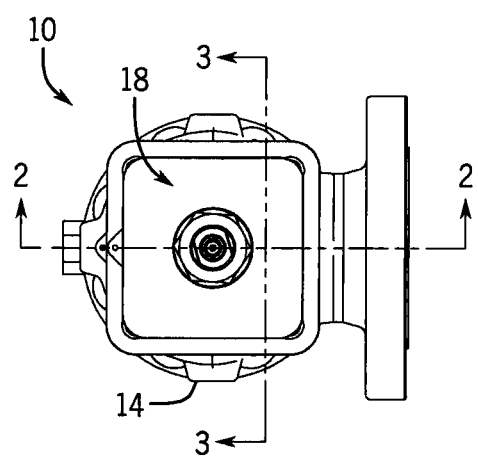
FIG. 1 is a top view of a pressure relief valve.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The following description includes four sections. Section I describes a pressure relief valve that includes a first construction of the invention with respect to FIGS. 1-10. Section II describes a pressure relief valve including a second construction of the invention with respect to FIGS. 11-16. Section III describes a pressure relief valve including a third construction of the invention with respect to FIGS. 17-26. Section IV includes a discussion of the invention in a broader sense as it relates to other valves types and other modes in which the invention can be used to attenuate and dampen vibrations.

Section I

Figure 2:
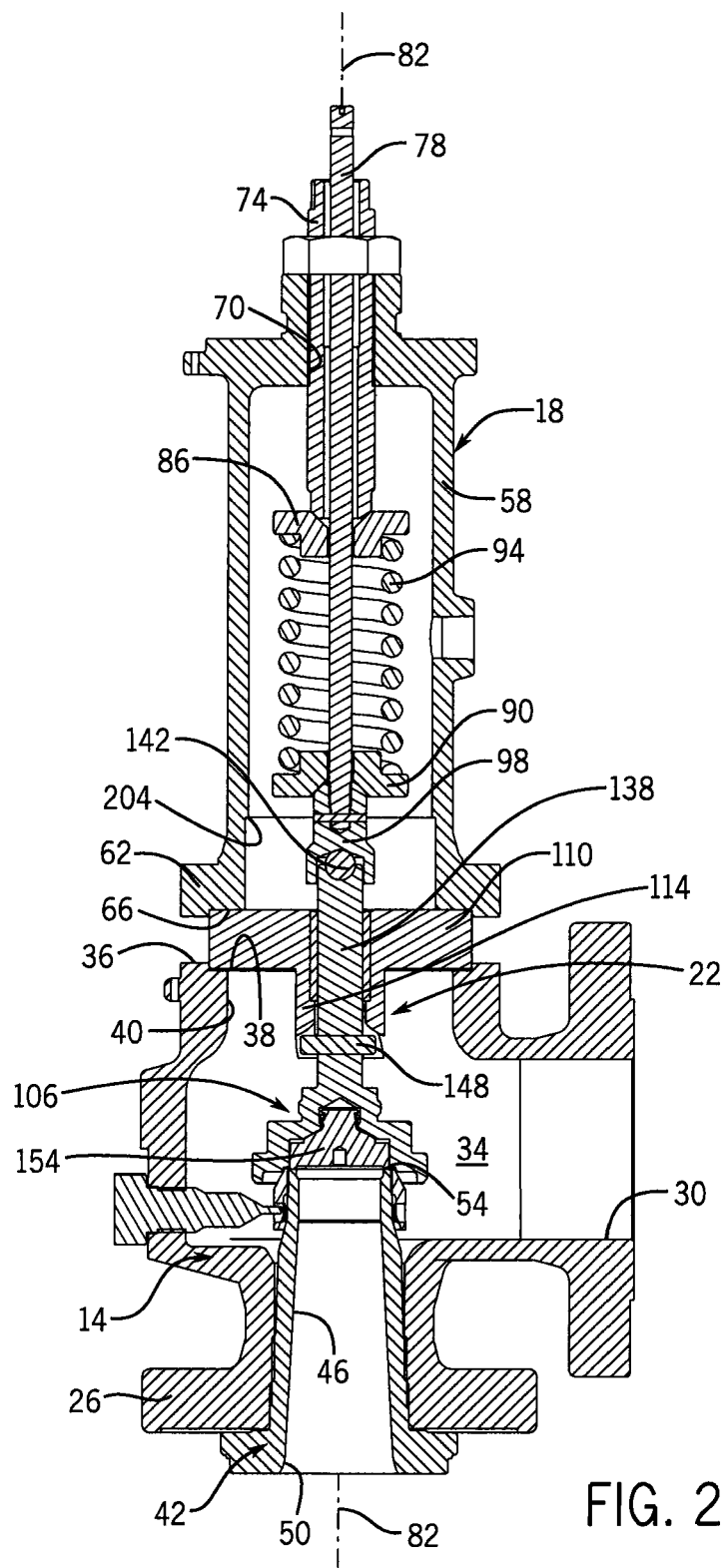
FIG. 2 is a section view of the pressure relief valve of FIG. 1 taken along the line 2-2 of FIG. 1.
Figure 3:
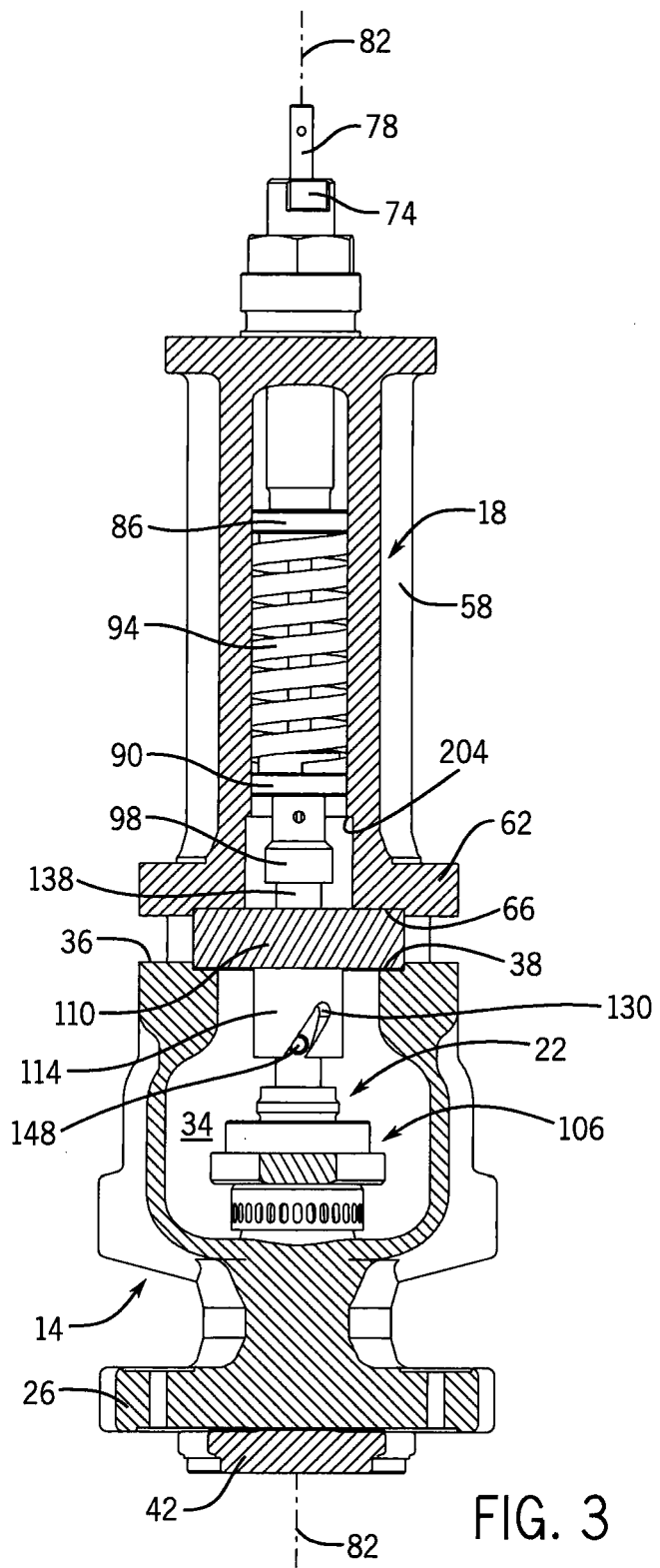
FIG. 3 is a section view of the pressure relief valve of FIG. 1 taken along the line 3-3 of FIG. 1.
Figure 4:
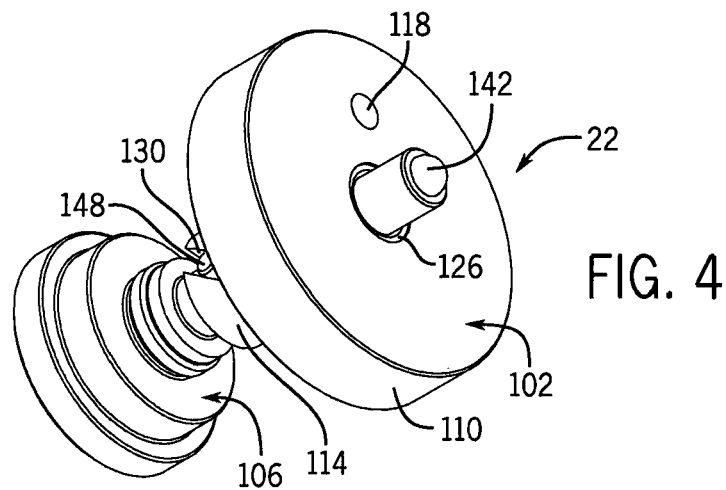
FIG. 4 is a top left perspective view of an inerter system of the pressure relief valve of FIG. 1.
Figure 5:
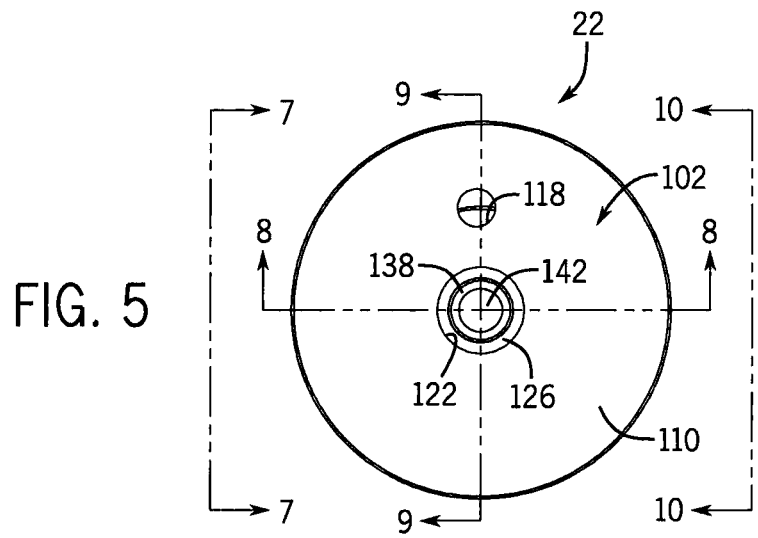
FIG. 5 is a top view of the inerter system of FIG. 4.
Figure 6:
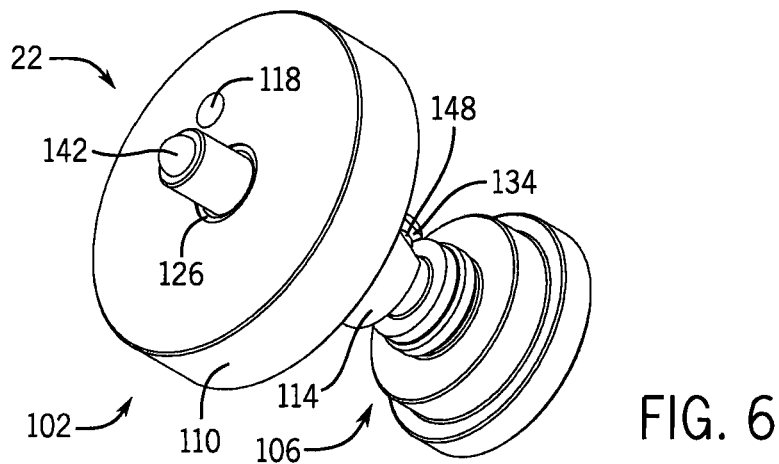
FIG. 6 is a top right perspective view of the inerter system of FIG. 4.
Figure 7:
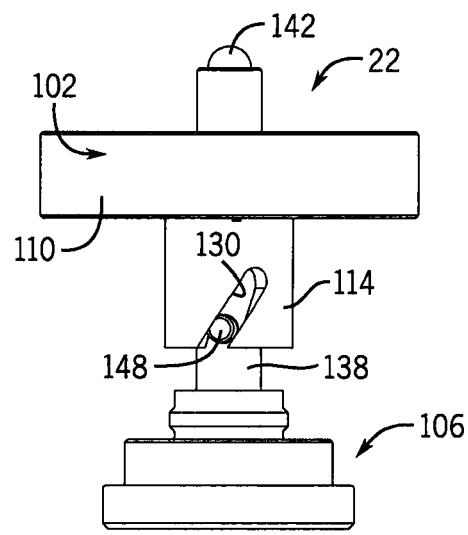
FIG. 7 is a left side view of the inerter system of FIG. 4 taken from the perspective of line 7-7 of FIG. 5.
Figure 10:
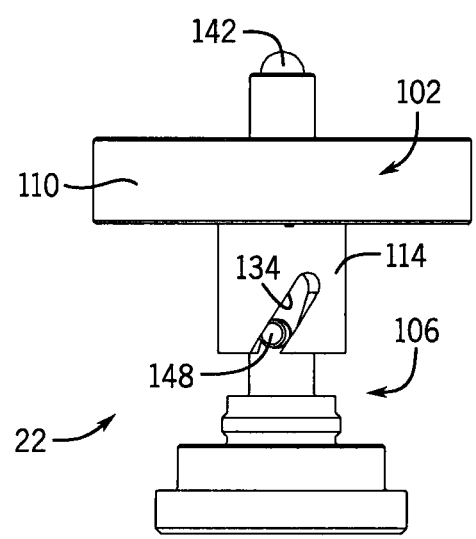
FIG. 10 is a right side view of the inerter system of FIG. 4 taken from the perspective of line 10-10 of FIG. 5.

FIGS. 1-3 show a pressure relief valve (hereinafter "PRV") 10 according to one embodiment of the invention. The PRV 10 serves to relieve pressure formed in a piping system, pressure vessel or associated component (hereinafter "pressure vessel system"). As shown in FIG. 2, the PRV 10 includes a housing 14, a bonnet 18, and an inerter system 22. The housing 14 defines an inlet flange 26 for coupling to the pressure vessel system, a flanged outlet port 30, an interior surface or chamber 34 between the inlet flange 26 and the outlet port 30, and bonnet flange 36 defining a shoulder 38 rimming an opening 40 adjacent an upper portion (as shown in FIG. 2) of the chamber 34. A nozzle 42 is received within the inlet flange 26 and defines a shaped nozzle profile 46 between a nozzle inlet 50 and a valve seat in the form of a nozzle outlet 54.

With continued reference to FIG. 2, the bonnet 18 includes a bonnet housing 58 that defines a housing flange 62 arranged for coupling to the bonnet flange 36 of the housing 14 and defining a shoulder 66. The bonnet housing 58 also defines an adjustment screw aperture 70 sized to threadingly receive an adjustment screw 74. A spindle 78 is slidingly received within the adjustment screw 74 and extends along a central axis 82. An upper spring washer 86 is positioned adjacent the adjustable screw 74 and slidingly receives the spindle 78. A lower spring washer 90 is positioned distally from the upper spring washer 86 with a spring 94 arranged therebetween. A spindle bracket 98 is pinned to a lower end (as shown in FIG. 2) of the spindle 78. The lower spring bracket 90 abuts the spindle bracket 98. The spring 94 acts between the upper spring washer 86 and the lower spring washer 90 to bias the spindle bracket 98 downward (as shown in FIG. 2). The adjustable screw 74 can be threaded into and out of the bonnet housing 58 to increase and decrease the biasing force applied by the spring 94.

Figure 8:
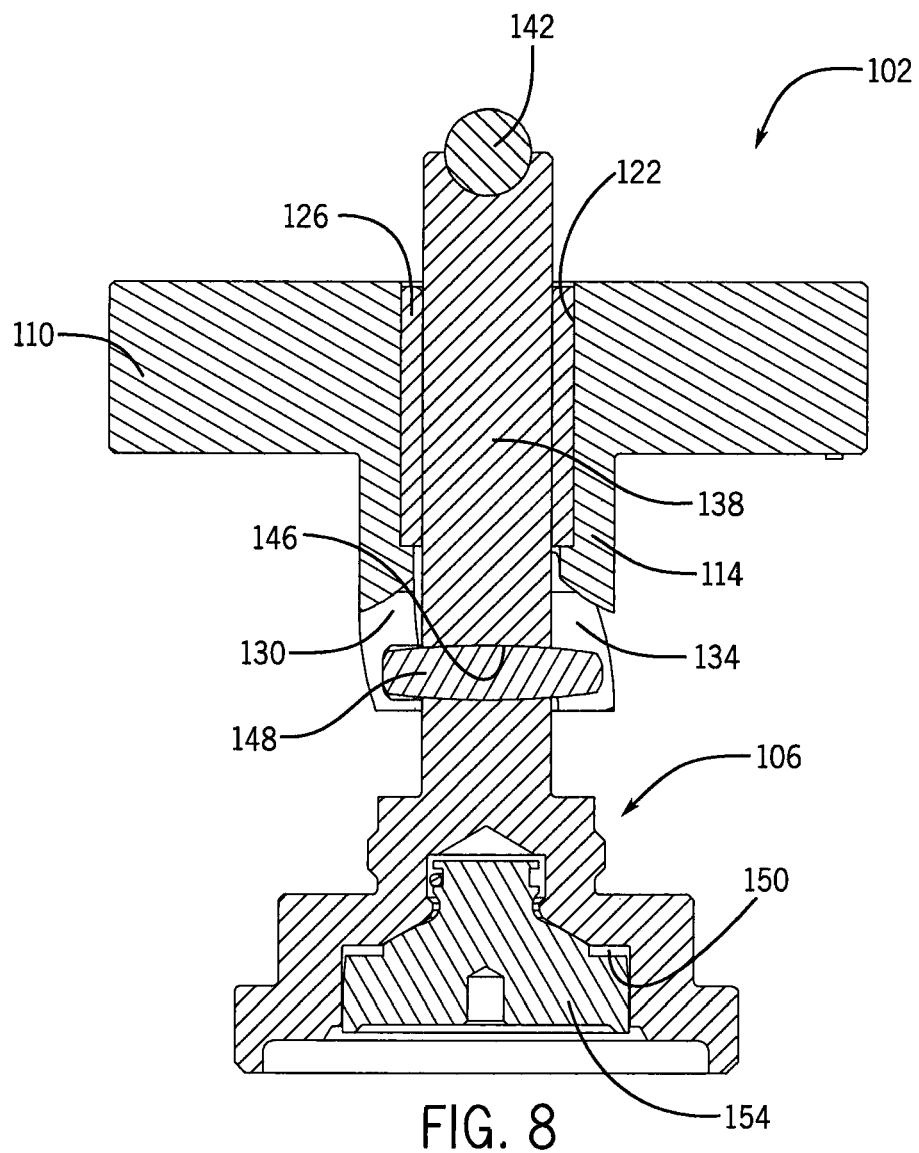
FIG. 8 is a section view of the inerter system taken along line 8-8 of FIG. 5.
Figure 9:
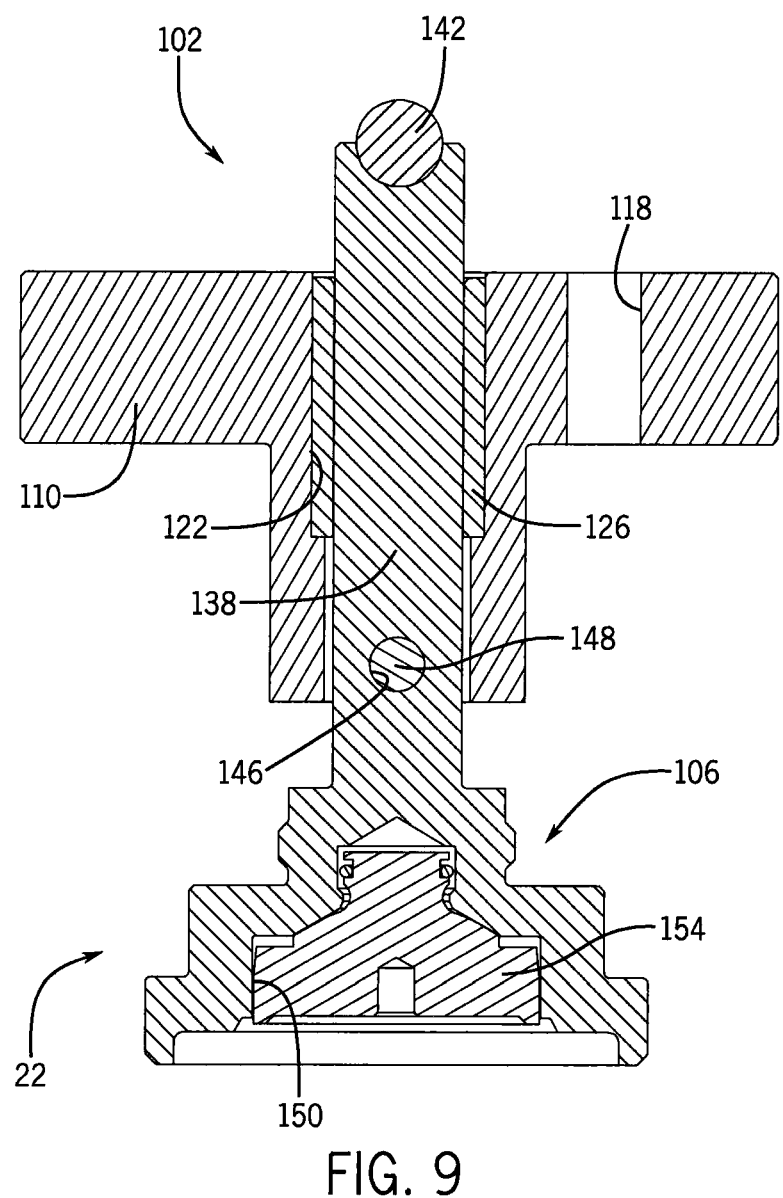
FIG. 9 is a section view of the inerter system taken along line 9-9 of FIG. 5.
Figure 11:
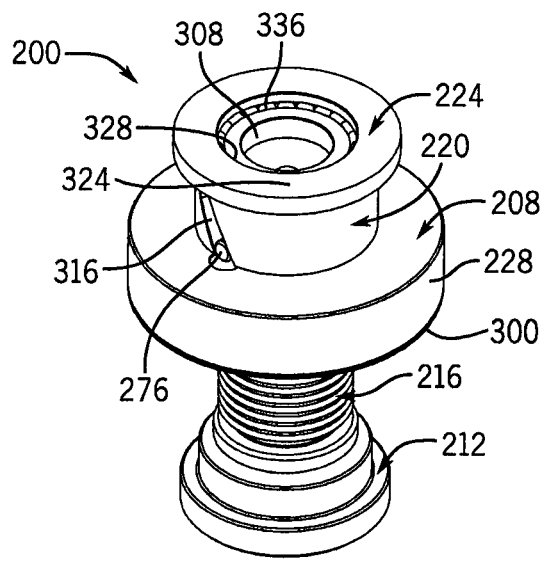
FIG. 11 is a top left perspective view of another inerter system.
Figure 12:
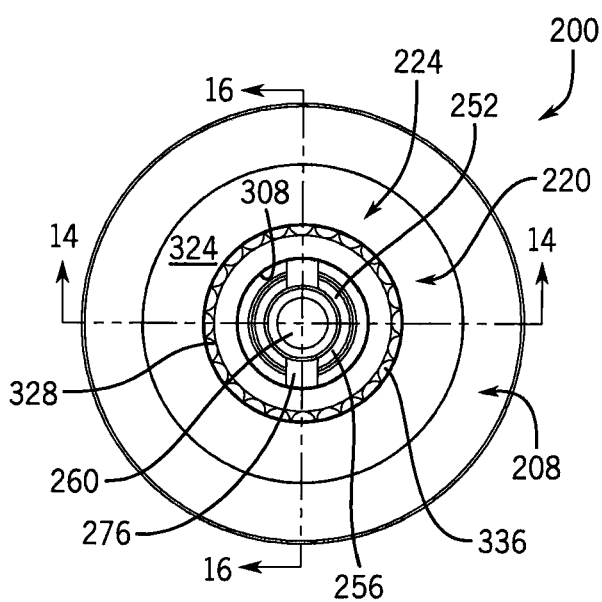
FIG. 12 is a top view of the inerter system of FIG. 11.
Figure 13:
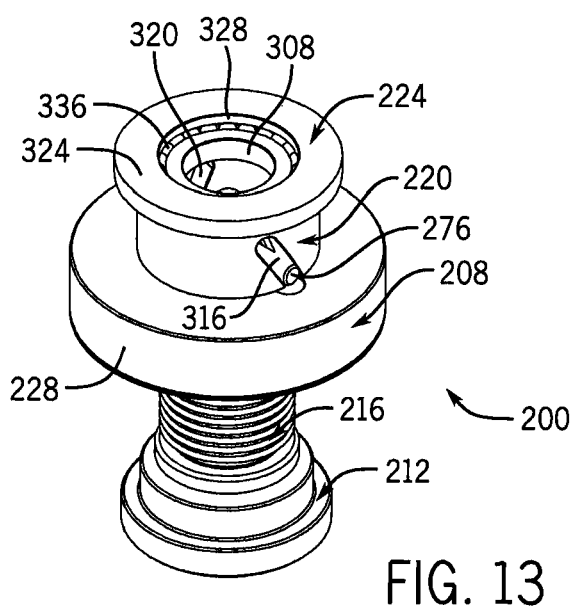
FIG. 13 is a top right perspective view of the inerter system of FIG. 11.

As shown in FIGS. 4-10, the inerter system 22 includes an inerter hub 102 and a valve member in the form of a disk holder 106. As shown in FIG. 8, the inerter hub 102 defines a hub flange 110 and a hub body 114. A vent 118 is defined in the hub flange 110 and a central hub bore 122 extends through the inerter hub 102 along the central axis 82. A bearing in the form of a bushing 126 is received within the central hub bore 122. The hub body 114 defines a first slot 130 and a second slot 134. The first slot 130 and second slot 134 together define a cam profile. In the illustrated embodiment, the slots 130, 134 provide a generally helical cam profile.

With continued reference to FIG. 8, the disk holder 106 includes a central shaft 138 that holds at a first end a bearing in the form of a spherical crystal bearing 142 and defines a pin aperture 146. A substantially cylindrical pin 148 is fixedly received within the pin aperture 146. The disk holder 106 also includes a disk recess 150 arranged to receive a disk 154.

Assembly of the PRV 10 will be described with reference to FIG. 2. The inerter system 22 is inserted into the bonnet flange 36 of the housing 14 such that the hub flange 110 is received on the shoulder 38. The bonnet 18 is installed onto the housing 14 and the inerter system 22 with the shoulder 66 of the housing flange 62 engaging the hub flange 110. The bonnet flange 36 is then fastened to the housing flange 62 with the hub flange 110 fixed therebetween such that the joint is substantially hermetically sealed and the inerter hub 102 is rotationally fixed relative to the housing 14. The vent 118 provides fluid communication between the chamber 34 and the bonnet 18 such that no substantial pressure differential exists therebetween.

With the housing 14, bonnet 18, and inerter system 22 assembled, the spindle bracket 98 engages the spherical bearing 142 and the spring 94 biases the disk holder 106 downward (as shown in FIG. 2) toward a closed position. The bias force is adjusted by manipulation of the adjustable screw 74 according to the predetermined specifications of the greater system in which the PRV 10 is installed (e.g., the pressure vessel system).

The disk holder 106 is arranged such that the pin 148 is received in the first slot 130 and the second slot 134 and the central shaft 138 is guided vertically by the bushing 126 for linear movement along the central axis 82. The disk 154 is arranged such that in the closed position (as shown in FIG. 2), the disk 154 engages the nozzle outlet 54 to inhibit fluid flow therethrough.

With continued reference to FIG. 2, when sufficient pressure builds in the nozzle inlet 50, the resultant force on the disk holder 106 will overcome the bias force exerted by the spring 94 such that the disk holder 106 will move toward an open position wherein the disk 154 does not engage the nozzle outlet 54 and fluid is permitted to flow from the nozzle inlet 50 and out the outlet port 30. The pin 148 rides along the cam profile of the first slot 130 and the second slot 134 during movement between the open position and the closed position.

When the disk holder 106 moves from the closed position toward the open position, the slots 130, 134 guide the pin 148 along the cam profile. The result is that the linear motion of the disk holder 106 is, at least in part, converted to rotational motion about the central axis 82. The configuration of the slots 130, 134 determines the ratio of conversion of linear motion to rotational motion. In particular, the conversion ratio for helically shaped slots having a long lead angle (i.e., more travel distance per one revolution) and a small helix angle is relatively small. Conversely, the conversion ratio for slots having a short lead angle (i.e., less travel distance per one revolution) and a large helix angle is greater. In one embodiment, the conversion ratio is approximately 9-10 inches of linear motion per one revolution of the disc holder 106. Other cam profiles are contemplated and would be used, as determined by one skilled in the art.

The inerter system 22 also converts translational kinetic energy, which is defined by:

$$E_{translation} = \tfrac{1}{2}mV^2;$$

where m=mass and
V=linear velocity
along the center axis 82 to rotational kinetic energy, which is defined by:

$$E_{rotational} = \tfrac{1}{2}J\omega^2;$$

where J=polar moment of inertia and
ω=angular velocity about the center axis 82.
Therefore, the disc holder 106 serves as a flywheel to which energy from linear motion in the form of vibration is transferred.

In the embodiment shown in FIGS. 1-10, the disc holder 106 rotates in response to linear motion caused by vibration, and thus, is sensitive to acceleration and more effective in reducing or controlling vibration than passive damping techniques. The mass of the disk holder 106 itself acts as the flywheel in the inerter system 22.

Section II

FIGS. 11-16 show an inerter system 200 that can be used with the housing 14 and bonnet 18 shown in FIGS. 1-3 in place of the inerter system 22. When the inerter system 200 is used with the bonnet 18, the bonnet housing 58 also defines a cap shoulder 204.

Figure 14:
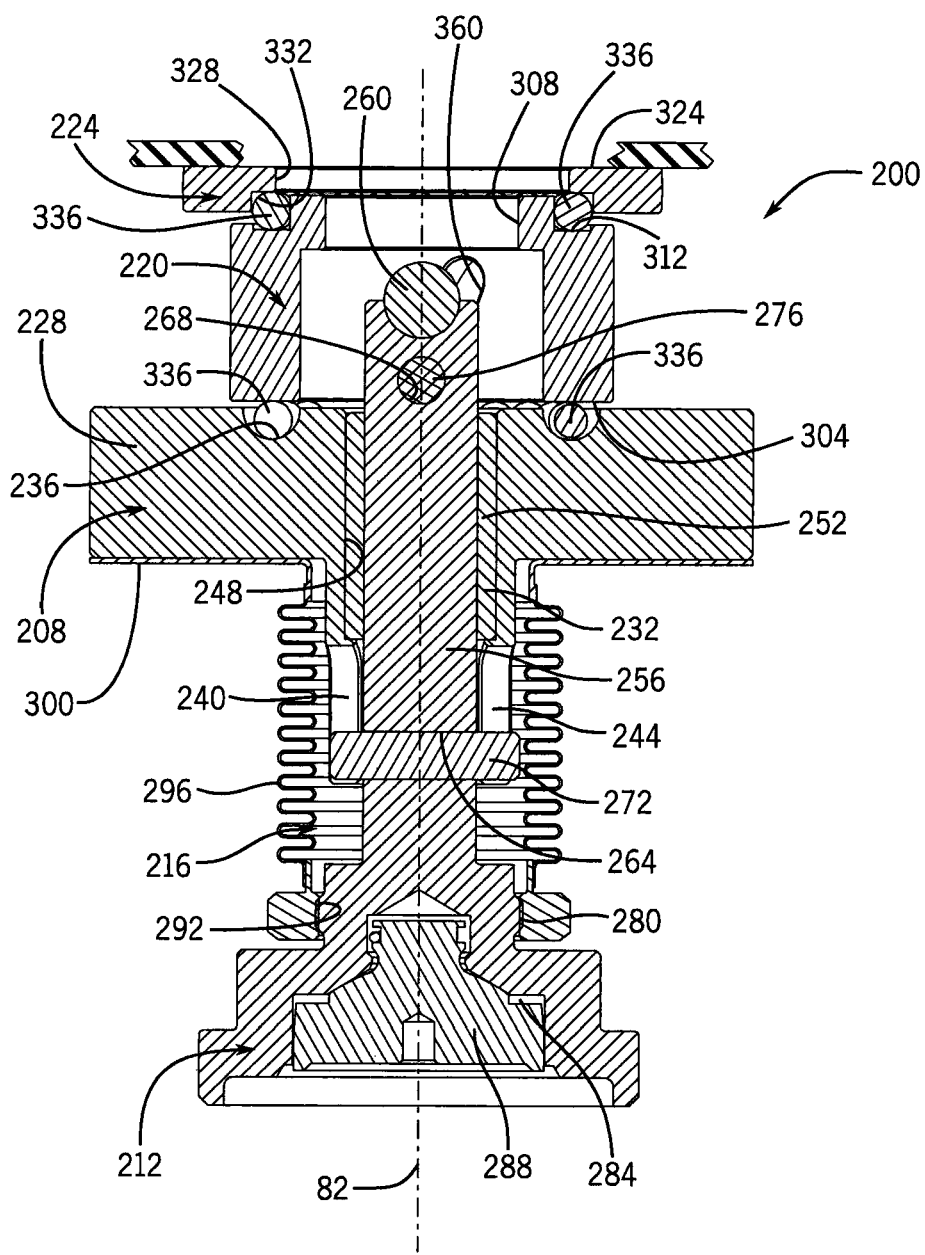
FIG. 14 is a sectional view of the inerter system of FIG. 11 taken along line 14-14 of FIG. 12.
Figure 16:
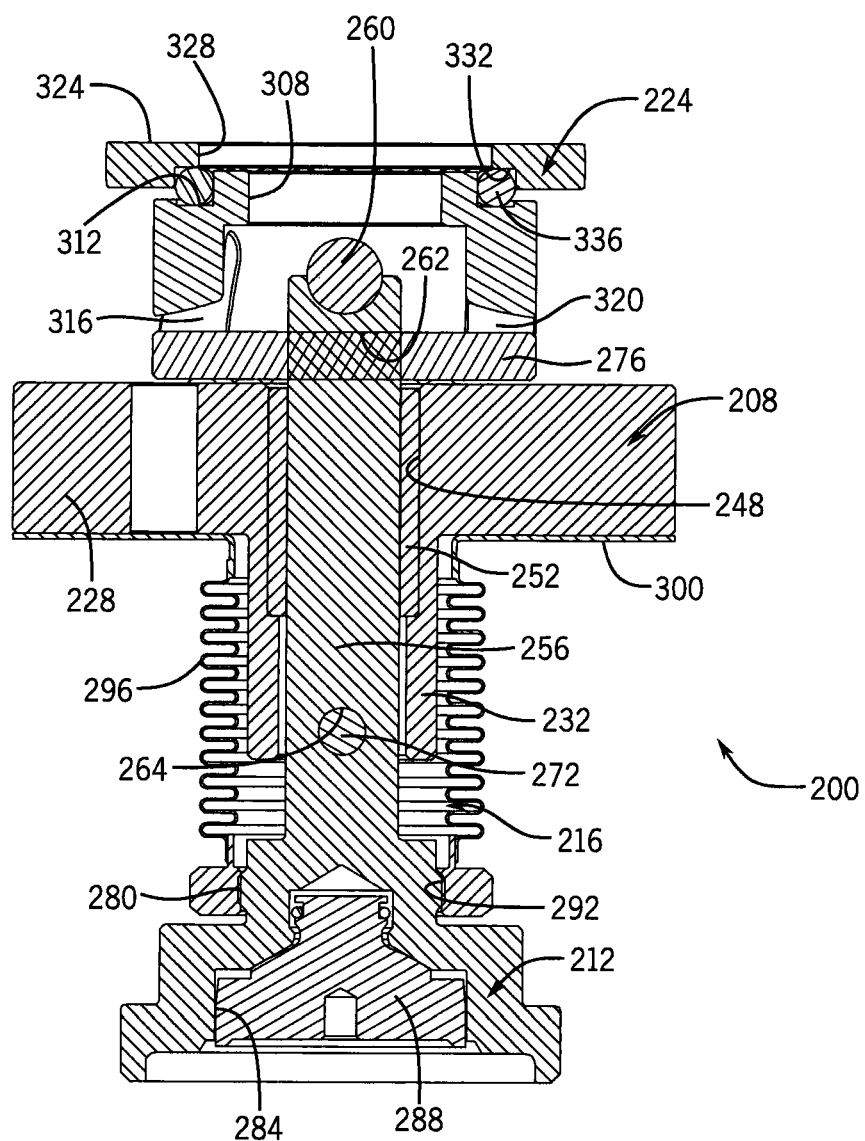
FIG. 16 is a section view of the inverter system of FIG. 11 taken along line 16-16 of FIG. 12.

As shown in FIG. 14, the inerter system 200 includes an inerter hub 208, a disk holder 212, a bellows 216, a flywheel 220, and a cap 224. The inerter hub 208 defines a hub flange 228 and a hub body 232. As shown in FIGS. 14 and 16, a bearing raceway 236 is defined in the hub flange 228. The bearing raceway 236 is a substantially semi-circular and annular raceway. Alternate arrangements are conceivable, such as a raceway arranged for pin bearings, etc. A first motion constraining slot 240 and a second motion constraining slot 244 are formed in the hub body 232. The motion constraining slots 240, 244 are parallel and substantially vertically oriented (as shown in FIG. 14). A central hub bore 248 is defined and extends through the inerter hub 208 along the central axis 82. A bearing in the form of a bushing 252 is received within the central hub bore 248.

With continued reference to FIG. 14, the disk holder 212 includes a central shaft 256 that holds at a first end a bearing in the form of a spherical crystal bearing 260 and defines a motion constraining pin aperture 264 and a flywheel pin aperture 268. A substantially cylindrical motion constraining pin 272 is fixedly received within the motion constraining pin aperture 264 and a substantially cylindrical flywheel pin 276 is fixedly received within the flywheel pin aperture 268. The disk holder 212 also defines a bellows mating feature in the form of threads 280 and a disk recess 284 sized to receive a disk 288.

The bellows 216 includes a mating feature in the form of threads 292 arranged to sealingly mate with the threads 280 of the disk holder 212. The bellows 216 further include a expandable body portion 296 arranged to accommodate vertical motion (as shown in FIG. 14) of the disk holder 212 and a gasket portion 300 arranged to mate with a bottom surface of the hub flange 228.

The flywheel 220 defines an annular ring that includes a bottom surface 304, an upper aperture 308, an upper bearing raceway 312, a first cam slot 316, and a second cam slot 320. The bottom surface 304 defines a bearing raceway and can define a different shape intended to function optimally with different bearing types than are illustrated herein. The first cam slot 316 and second cam slot 320 together define a cam profile. In the illustrated embodiment, the slots 316, 320 provide a generally helical and linear cam profile.

The cap 224 defines an upper surface 324, an inner aperture 328, and a bearing raceway 332. The illustrated bearing raceway 332 is a shoulder recess. In other arrangements, the bearing raceway 332 can be arranged differently. For example, the raceway 332 can be arranged to receive pin bearings, or can include a contoured surface (e.g., semi-circular depression, rectangular recess, etc.).

With continued reference to FIG. 14, the inerter system 200 is assembled by installing the bellows 216 onto the disk holder 212 by threading the bellows threads 292 onto the disk holder threads 280 such that a seal is formed therebetween. The disk holder 212 and bellows 216 are then installed on the inerter hub 208 by sliding the central shaft 256 into the bushing 252 and positioning the disk holder 212 such that the motion constraining pin 272 is received within the motion constraining slots 240, 244. The motion of the disk holder 212 is then constrained by the slots 240, 244 to substantially only vertical movement (as shown in FIG. 14) and substantial rotation is inhibited.

Figure 15:
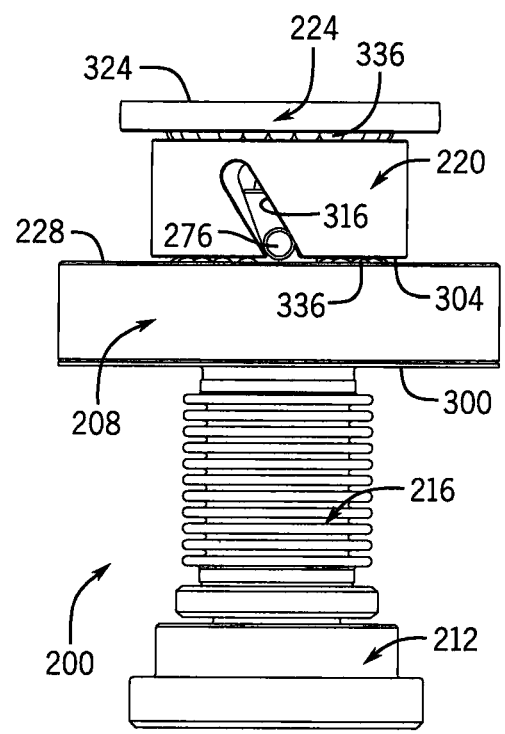
FIG. 15 is a front view of the inerter system of FIG. 11.
Figure 17:
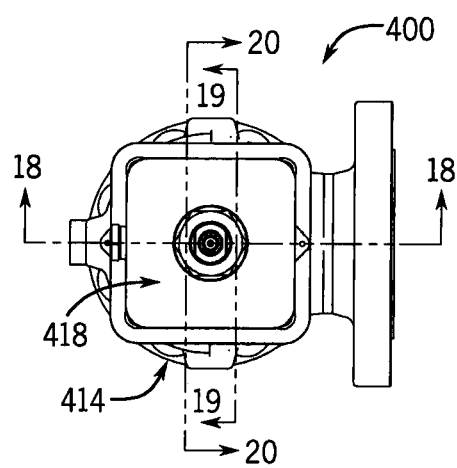
FIG. 17 is a top view of another pressure relief valve.

A bearing element in the form of a plurality of ball bearings 336 is arranged in the bearing raceway 236 of the inerter hub 208, and the flywheel 220 installed onto the inerter system 200 by engaging the first cam slot 316 and the second cam slot 320 with the flywheel pin 276, and engaging the bottom surface 304 with the ball bearings 336. As shown in FIGS. 15 and 16, the bearing raceway 236 of the inerter hub 208 does not extend around the full annulus of the central hub bore 248, but rather inhibits the ball bearings 336 from interfering with the flywheel pin 276 when the disk holder 212 is in the closed position (as shown in FIG. 15). In other constructions, the bearing raceway 236 can extend fully about the central hub bore 248 and the pin 276 can be arranged differently so no interference exists.

Another bearing element (in the form of ball bearings 336) is arranged between the upper bearing raceway 312 of the flywheel 220 and the bearing raceway 332 of the cap 224. The ball bearings 336 provide smooth rotation of the flywheel 220 under load. As noted above, other bearing elements can be used. For example, the ball bearings 336 can be retained within separate raceways, the bearing elements can be pin or needle bearings, conical bearings, or another shape of bearing, as desired. The bearing elements can include bushings, or other arrangements designed to provide adequate rotation of the flywheel 220.

The assembled inerter system 200 is then installed between the housing 14 and the bonnet 18 (see FIGS. 2 and 14). The inerter system 200 is inserted into the housing 14 such that the gasket portion 300 of the bellows 216 engages and seals against the shoulder 38 of the housing 14. The shoulder 66 of the bonnet 18 engages the inerter hub 208, and the cap shoulder 204 of the bonnet 18 engages the upper surface 324 of the cap 224. When the bonnet 18 is fastened to the housing 14, the hub flange 228 and the gasket portion 300 are compressed between the shoulder 66 of the bonnet 18 and the shoulder 38 of the housing 14 such that rotation of both components is inhibited. The cap 224 is compressed relative to the inerter hub 208 to constrain the flywheel 220. The ball bearings 336 provide for rotational movement of the flywheel 220.

In operation, and referring to portions of FIGS. 2, 14, and 16, the disk holder 212 is movable between a closed position in which the disk 288 seals against the nozzle outlet 54 to inhibit fluid flow therethrough, and an open position in which the disk disengages from the nozzle outlet 54 to permit fluid flow through the nozzle 42 and out the outlet port 30. Movement of the disk holder 212 is constrained by the central shaft 256 and the motion constraining pin 272 such that the disk holder 212 moves only in the vertical direction (as shown in FIG. 14) between the open position and the closed position with substantially no rotational movement.

The bellows 216 is arranged to compress and expand along with the motion of the disk holder 212 between the open position and the closed position. The bellows 216 provides a barrier between the fluid and the other components of the inerter system 200 as can be advantageous in corrosive fluid control or other implementations.

As the disk holder 212 moves between the open position and the closed position, the flywheel pin 276 engages and moves along the first cam slot 316 and the second cam slot 320 such that the flywheel 220 is forced into rotation by the cam profile defined by the first cam slot 316 and the second cam slot 320. The rotation of the flywheel 220 causes inertial damping of the disk holder 212 similarly to the inerter system 22 discussed above in Section I.

Section III

Figure 18:
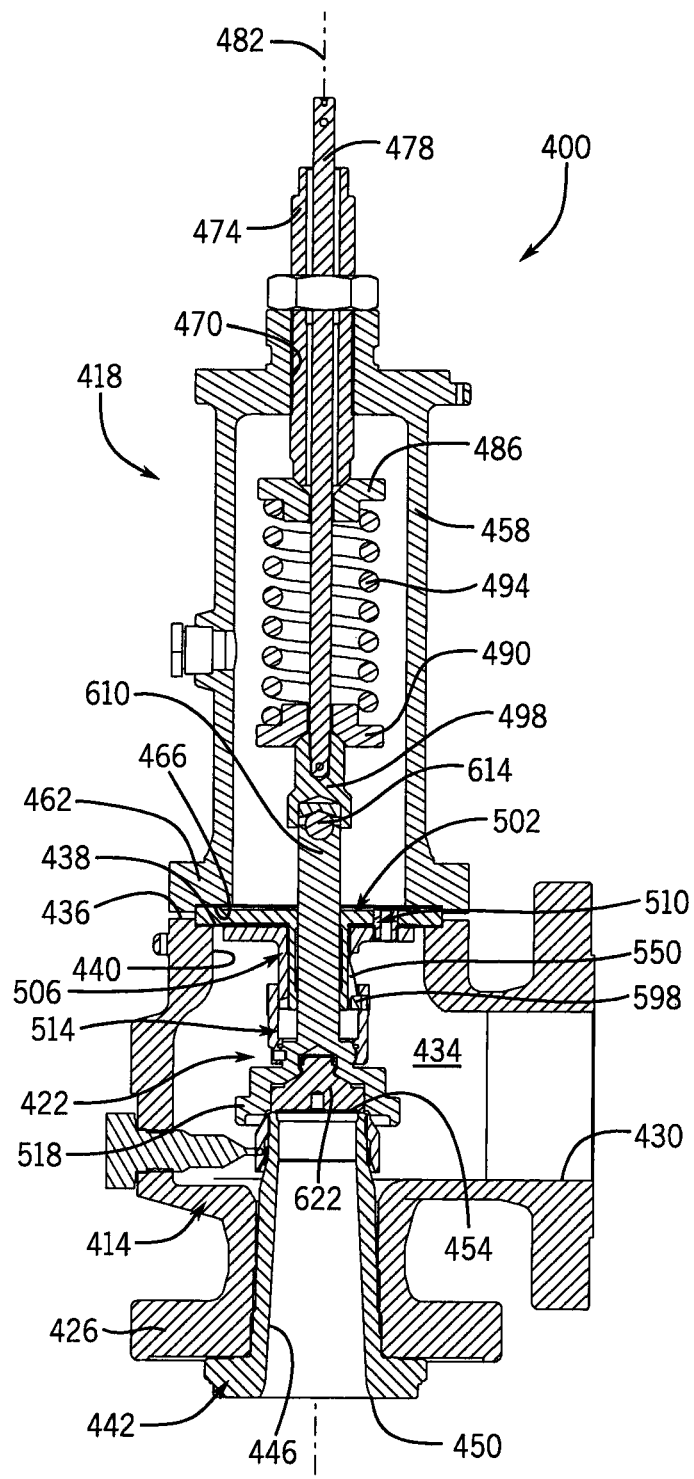
FIG. 18 is a section view of the pressure relief valve of FIG. 18 taken along line 18-18 of FIG. 17.
Figure 19:
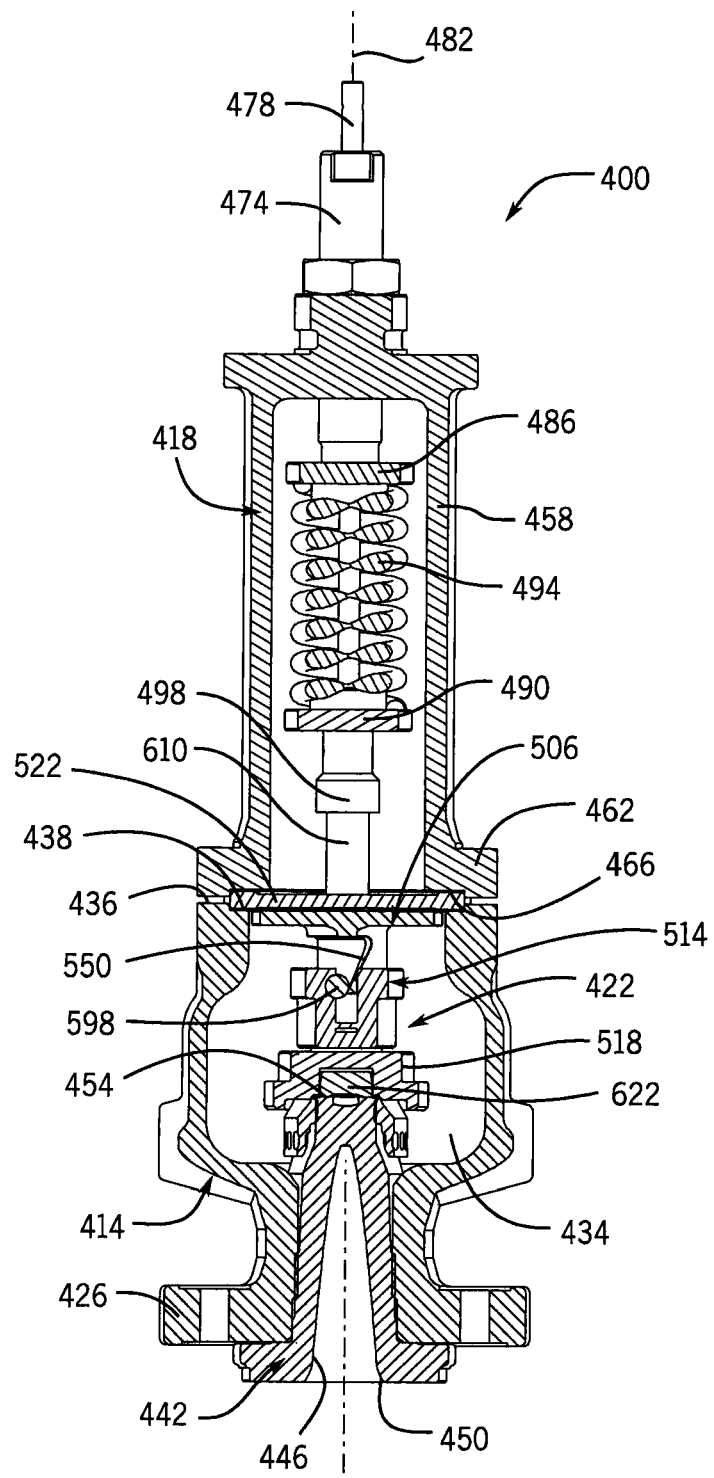
FIG. 19 is a section view of the pressure relief valve of FIG. 18 taken along line 19-19 of FIG. 17.
Figure 20:
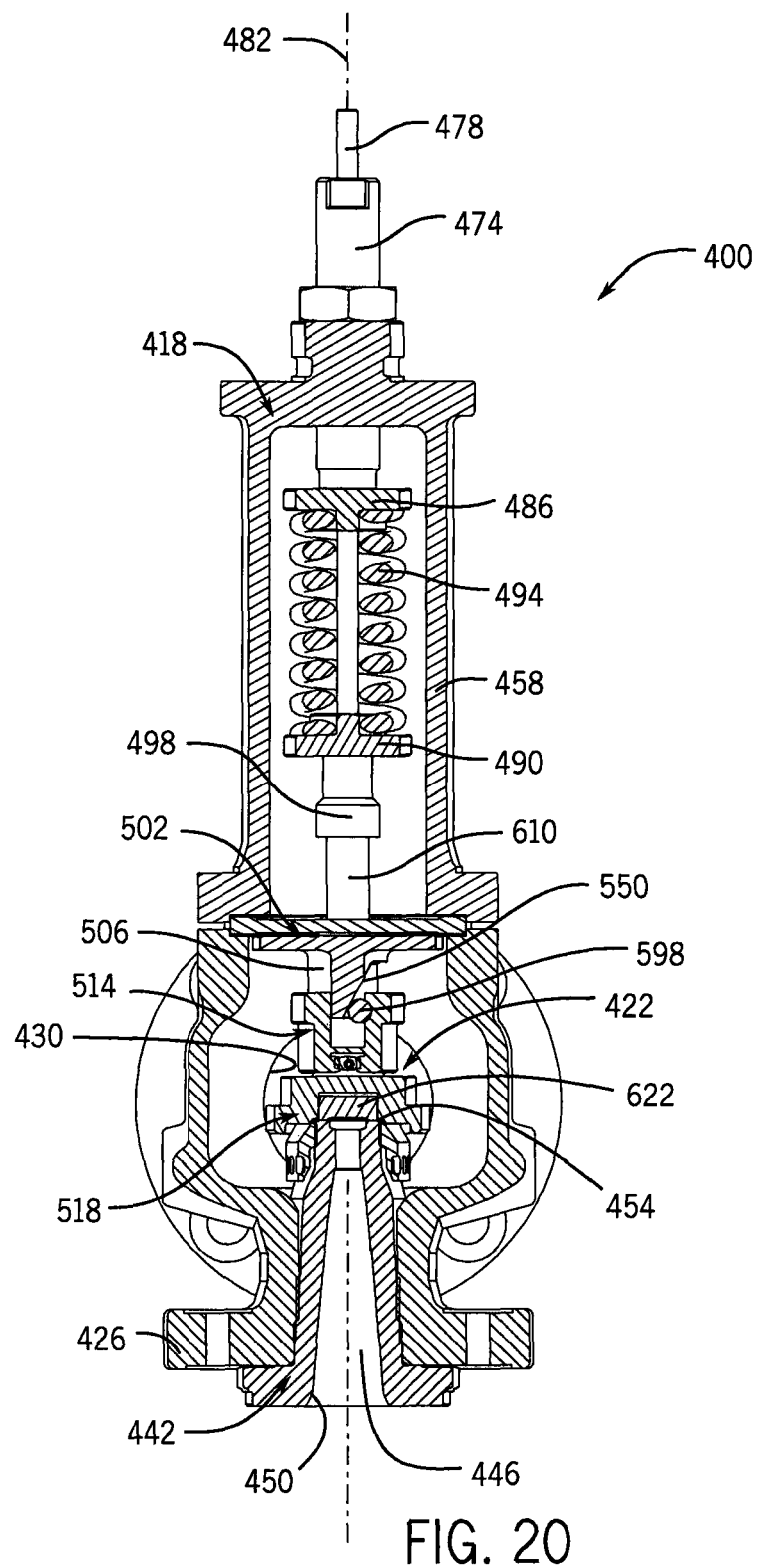
FIG. 20 is a section view of the pressure relief valve of FIG. 18 taken along line 20-20 of FIG. 17.
Figure 21:
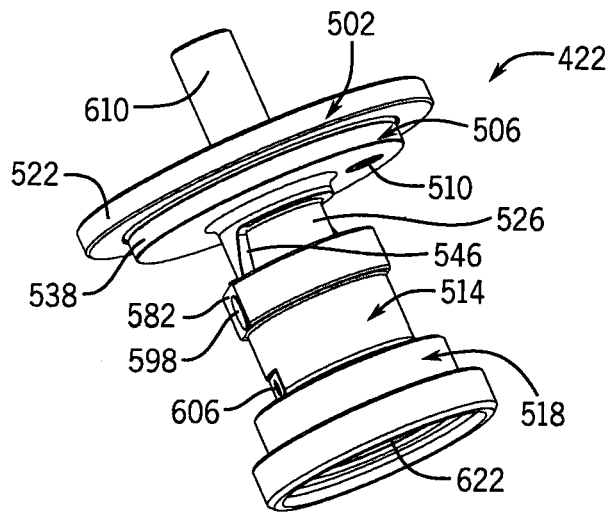
FIG. 21 is a bottom right perspective view of another inerter system.

FIGS. 17-26 show a PRV 400 according to one embodiment of the invention that includes a housing 414, a bonnet 418, and an inerter system 422. As shown in FIG. 18, the housing 414 defines an inlet flange 426 for coupling to a pressure vessel system, a flanged outlet port 430, an interior surface or chamber 434 between the inlet flange 426 and the outlet port 430, and a bonnet flange 436 defining a housing shoulder 438 rimming an opening adjacent an upper portion 440 (as shown in FIG. 18) of the chamber 434. A nozzle 442 is received within the inlet flange 426 and defines a shaped nozzle profile 446 between a nozzle inlet 450 and a nozzle outlet 454.

The bonnet 418 includes a bonnet housing 458 that defines a housing flange 462 arranged for coupling to the bonnet flange 436 of the housing 414 and defining a bonnet shoulder 466. The bonnet housing 458 also defines an adjustment screw aperture 470 sized to threadingly receive an adjustment screw 474. A spindle 478 is slidingly received within the adjustment screw 474 and extends along a central axis 482. An upper spring washer 486 is positioned adjacent the adjustable screw 474 and slidingly receives the spindle 478. A lower spring washer 490 is positioned distally from the upper spring washer 486 with a spring 494 arranged therebetween. A spindle bracket 498 is pinned to a lower end (as shown in FIG. 18) of the spindle 478. The lower spring washer 490 abuts the spindle bracket 498. The spring 494 acts between the upper spring washer 486 and the lower spring washer 490 to bias the spindle bracket 498 downward (as shown in FIG. 18). The adjustable screw 474 can be threaded into and out of the bonnet housing 458 to increase and decrease the biasing force applied by the spring 494, as desired.

Figure 24:
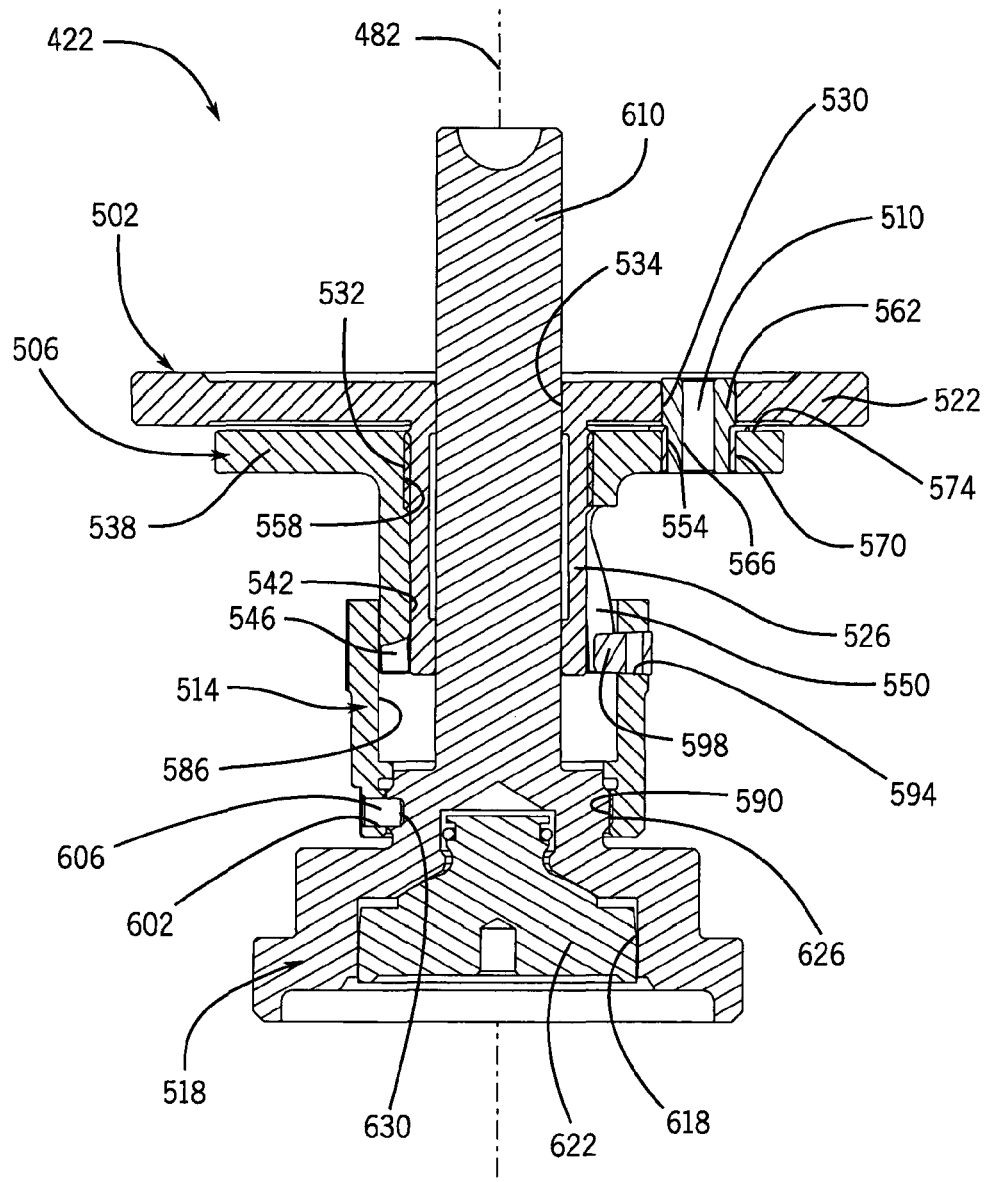
FIG. 24 is a sectional view of the inerter system of FIG. 21 taken along line 24-24 of FIG. 22.
Figure 25:
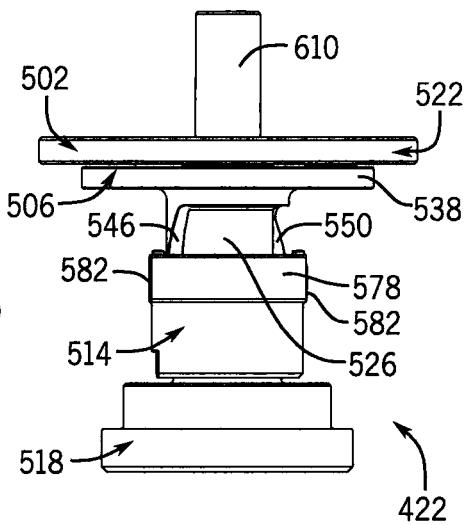
FIG. 25 is a front view of the inerter system of FIG. 21.

As shown in FIG. 24, the inerter system 422 includes an inerter hub 502, a cam element 506, a jerk absorber 510, a cam follower element 514, and a disk holder 518. The inerter hub 502 defines a hub flange 522, a hub body 526 extending downward (as shown in FIG. 24) from the hub flange 522, and a jerk aperture 530 defined through the hub flange 522. The hub body 526 defines hub body threads 532 substantially adjacent the hub flange 522. A central aperture 534 is defined through the inerter hub 502 along the central axis 482. In the illustrated embodiment, the central aperture 534 is manufactured such that an inner surface of the central aperture 534 forms a bearing surface. The bearing surface can be machined and polished, reamed, or formed in another way to provide a suitable bearing surface. In other constructions, a bearing or bushing can be inserted within the central aperture 534.

With continued reference to FIG. 24, the jerk aperture 530 is sized to press fittingly receive the jerk absorber 510. Alternatively, the jerk aperture 530 can be threaded, or can be filleted in preparation of a welding procedure. Other arrangements are conceivable (e.g., soldering, fastening, gluing, etc.).

The cam element 506 defines a cam element flange 538, a central aperture 542 that is sized to receive the hub body 526, a first cam 546, and a second cam 550. The cam element flange 538 defines a jerk aperture 554. The central aperture 542 defines cam element threads 558 sized to loosely engage the hub body threads 532. The first cam 546 and the second cam 550 together define a cam profile. In the illustrated embodiment, the cams 546, 550 provide a generally helical cam profile.

Figure 22:
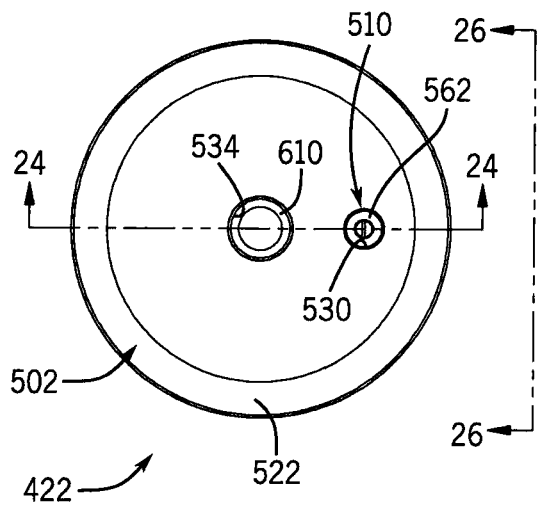
FIG. 22 is a top view of the inerter system of FIG. 21.
Figure 23:
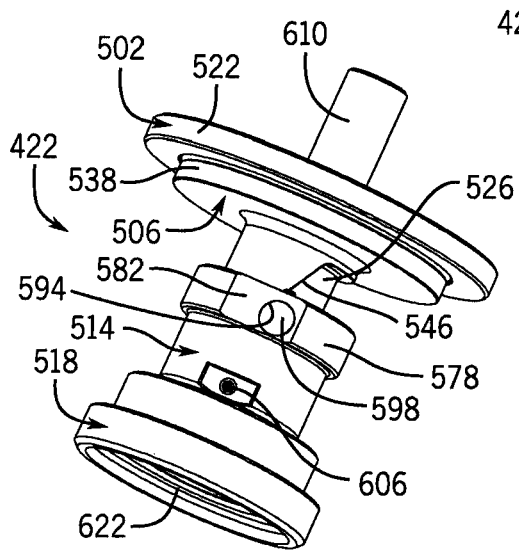
FIG. 23 is a bottom left perspective view of the inerter system of FIG. 21.

As shown in FIGS. 22 and 24, the jerk absorber 510 includes a jerk pin 562 that defines a vent 566 (as shown in FIG. 24) and is sized to be press fit into the jerk aperture 530 of the inerter hub 502. The jerk absorber 510 also includes a bushing 570 engaged on the jerk pin 562 and received within the jerk aperture 554 of the cam element 506. The illustrated bushing 570 is constructed of a shock dissipating-material such as rubber, includes a bushing flange 574 arranged to be sandwiched between the hub flange 522 and the cam flange 538, and is snugly received within the jerk aperture 554 of the cam element 506.

Figure 26:
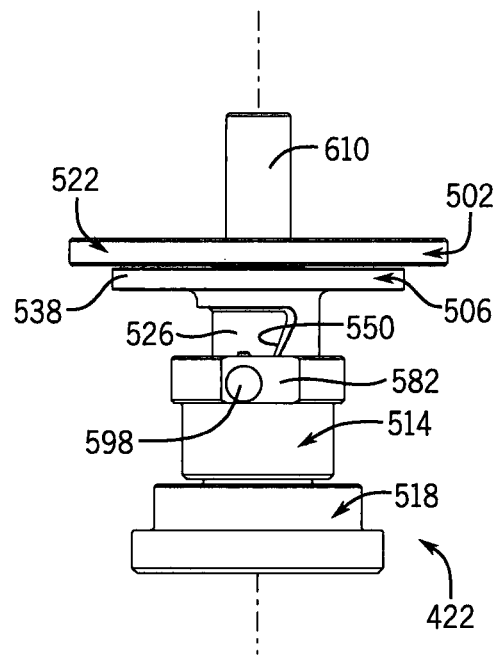
FIG. 26 is a right side view of the inerter system of FIG. 21 taken from the perspective of line 26-26 of FIG. 22.

The cam follower element 514 defines a follower flange 578 that includes two flat portions 582, a central aperture 586 sized to receive the cam element 506, and a follower threaded portion 590. Each flat portion 582 includes a cam pin aperture 594 sized to receive a cam pin 598. The cam pin apertures 594 (and therefore the pins 598) are positioned off-center with respect to the center axis 482 (as shown in FIG. 26). The cam pins 598 are arranged to engage the first cam 546 and the second cam 550. The follower threaded portion 590 includes a threaded aperture 602 sized to receive a set screw 606.

The disk holder 518 defines a central shaft 610 that holds at a first end a bearing in the form of a spherical crystal bearing 614 (as shown in FIG. 18) and defines a disk recess 618 arranged to receive a disk 622. The disk holder 518 further includes a holder threaded portion 626 arranged to threadingly receive the follower threaded portion 590, and a set screw aperture 630 arranged to receive the set screw 606.

Assembly of the inerter system 422 will be described with reference to FIG. 24. The jerk bushing 570 is inserted into the jerk aperture 554 of the cam element 506. The cam element 506 is then coupled to the inerter hub 502 by threading the cam element threads 558 onto the hub body threads 532. The threads 558, 532 engage loosely such that the cam element 506 spins easily. The jerk aperture 530 of the inerter hub 502 is then aligned with the jerk aperture 554 of the cam element 506. The jerk pin 562 is press fit into the jerk aperture 530 of the inerter hub 502, and the jerk bushing 570 that is positioned in the jerk aperture 554 of the cam element 506.

The threaded portion 590 of the cam follower element 514 is then threaded onto the threaded portion 626 of the disk holder 518, and the set screw 606 is tightened such that the cam follower element 514 is substantially rigidly coupled to the disk holder 518.

The disk holder 518 and the cam follower element 514 are then slid onto the cam element 506 such that the pins 598 are engaged with the first cam 546 and the second cam 550.

As shown in FIG. 18, with the inerter system 422 assembled, the hub flange 522 is engaged with the shoulder 438 of the housing 414 such that the disk 622 engages the nozzle outlet 454. The bonnet 418 is then installed with the shoulder 466 of the bonnet flange 462 engaging the hub flange 522 and the spindle bracket 498 engaging the spherical bearing 614. The bonnet 418 is then fastened to the housing 414 such that the inerter hub 502 is fixed in place and inhibited from rotational and linear movement.

In operation, and as shown in FIG. 18, the disk holder 518 is moveable between an open position where fluid is permitted to flow from the nozzle inlet 450 through the nozzle outlet 454, and out of the outlet port 430, and a closed position where the disk 622 engages the nozzle outlet 454 and inhibits fluid flow therethrough.

The PRV 400 is typically in the closed position, and when pressure acting on the disk holder 518 overcomes the bias force of the spring 494, the disk holder 518 moves toward the open position. Moving toward the open position, the pins 598 engage the first cam 546 and the second cam 550 and move the disk holder 518 along the cam profile. This results in a translation of linear motion to rotational work and has an inertial damping effect on the system, as discussed above.

The jerk absorber 510 functions to absorb the initial shock and impact that the inerter system 422 undergoes upon the pressure in the pressure vessel or any downstream vibration overcoming the bias force of the spring 494. The jerk bushing 570 absorbs the impact and the threaded portions 532, 558 interact to allow a slight rotation of the cam element 506 relative to the inerter hub 502.

Section IV

Many current PRVs form an undamped linear spring mass mechanism and are configured to enable pressure control over narrow pressure ranges. Resonant acoustic frequencies due to inlet pipe and/or other periodic inlet pipe dynamics cause an undesirable rapid cycling motion or vibration in the PRVs, sometimes known as "chatter," wherein the disc rapidly cycles between the open and closed positions. Such vibration reduces the capacity of the PRV and can cause damage to internal components such as the disc and valve seat (i.e., nozzle outlet). Attempts have been made to reduce the effects of such vibration by modifying disc face, seat, and nozzle geometries in order to enhance the stability of PRVs. This method is effective at enhancing stability at relatively low pressures but has limited effectiveness in enhancing stability at relatively high pressures. Further, the use of passive damping techniques such as viscous type dampers (i.e., velocity sensitive dampers) or drag type dampers (i.e., position sensitive dampers) have been marginally successful in addressing undesirable vibration. In particular, such techniques are effective only after the vibration has already started.

Embodiments of the invention provide, among other things, an inerter system wherein linear motion along a center axis is converted to rotational motion about the center axis. This conversion has the effect of adding inertial damping to the PRV. The inerter system reacts to acceleration of the system, as opposed to the more traditional passive systems that react to velocity. In other words, the invention has a much faster reaction and provides better damping with significantly less movement of the disc holder away form the nozzle outlet.

The magnitude of the inertial damping effect provided by the inerter system is at least in part controlled by a cam profile defined by the structure of the inerter system (e.g., slots 130, 134, 316, 320 and cams 546, 550). The cam profile can have a constant or variable lead, a curved shape, a variable shape, a straight shape that is angled relative to the center axis, a shape in accordance with a square or cube root function or a combination of such shapes, and other suitable shapes. In one construction, the cam profile is helically shaped. In another construction, the cam profile can include at least one stepped portion that is located between first and second curved portions, for example. In such a configuration, the disc holder initially rotates in a first portion of the cam profile, dwells, then resumes rotation in a second portion of the cam profile. In one construction, the cam profile has a right hand lead, resulting in a corresponding rotation direction. Alternatively, the cam profile can be positioned in an angled orientation relative to the center axis that is opposite than that depicted in the figures. For example, the cam profile can have a left hand lead.

Embodiments of the invention control vibration in a PRV without adding significant mass to the disc holder when compared with a typical disk holder. As a result, existing PRVs can be retrofitted in the field with the invention without extensive modification. In addition, the invention can be used in conjunction with other types of valves. The invention can also be used in any suitable valve configuration having a component or components, such as a valve stem that includes a disc or other components, which move in a linear motion and which are susceptible to an undesirable rapid cycling motion due to dynamic instability or vibration. For example, the invention can be applied to various types of line valves, check valves, relief valves, or other valves that are subject to vibrations and pressure fluctuations.

In some embodiments of the invention, 15-20% of the energy produced by vertical movement is converted to rotary energy in the damping process. In other embodiments, more or less energy can be converted, depending on the desired characteristics of the damping system. For example, 10-50% or more of the vertical energy can be converted to rotary energy by the inerter system. As discussed above, the cam profile can be manipulated to produce the desired damping characteristics.

Another advantage offered by embodiments of the invention is the ability to produce damped valves that are functional as single fluid valves. That is to say, a single valve design can be used for both a gas product and a liquid product. Current passively damped valves are not suitable for single fluid arrangement, because they are not capable of damping the systems to stability in the presence of the variety of conditions that are posed by a liquid product versus a gas product, or vice versa.

The invention recognizes the problem of damping and chatter issues as a lack of non-active systems that dampen in response to acceleration of a vibration and provide a wide ranging mode for dealing with such vibrations. The concept of a floating input (e.g., disk holder, etc.) is one that reacts to non-mechanical force such as pressure. That is to say, the floating input is not coupled between two fixed mechanical points for damping vibrations formed therebetween. For example, a floating input is not connected to a linkage (e.g., automobile suspension), not directly moved by a contact force (e.g., physical impact by an object), or rigidly coupled at its extremities.

Although the above described valves are direct spring operated, the invention is capable with working with suitable actuation systems, including but not limited to, pilot operation, solenoid operation, and other control mechanisms.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A pressure relief valve comprising:
   a housing defining an inlet, an outlet, and a valve seat between the inlet and the outlet;
   a bonnet coupled to the housing and including a controller;
   an inerter system coupled between the housing and the bonnet and including
      an inerter hub fixed to the housing to inhibit substantial rotation and linear movement,
      the inerter hub defining a cam profile, and
      a valve member received by the inerter hub and moveable between an open position where flow is provided from the inlet through the valve seat to the outlet, and a closed position where flow is inhibited through the valve seat, a portion of the valve member engaging the cam profile,
   the controller biasing the valve member toward the closed position,
   the valve member moving toward the open position when a predetermined pressure is achieved within the inlet, and
   linear movement of the valve member from when the valve member first leaves the open position toward the closed position, and from when the valve member first leaves the closed position toward the open position causing rotation of the valve member along the cam profile to provide inertial damping.

2. The pressure relief valve of claim 1, wherein the cam profile is a slot formed in the inerter hub, and the valve member includes a pin that engages the slot.

3. The pressure relief valve of claim 1, wherein the cam profile is helical.

4. The pressure relief valve of claim 1, wherein the valve member moves linearly and rotates about an axis.

5. The pressure relief valve of claim 1, wherein the controller is an adjustable spring.

6. The pressure relief valve of claim 1, wherein the valve member includes a disk holder arranged to receive a disk for sealing against the valve seat, and a central shaft that is received by the inerter hub, the central shaft extending through the inerter hub.

7. The pressure relief valve of claim 1, wherein the valve member is coupled to the inerter hub by a bearing element.

* * * * *